United States Patent Office 3,154,315
Patented Oct. 27, 1964

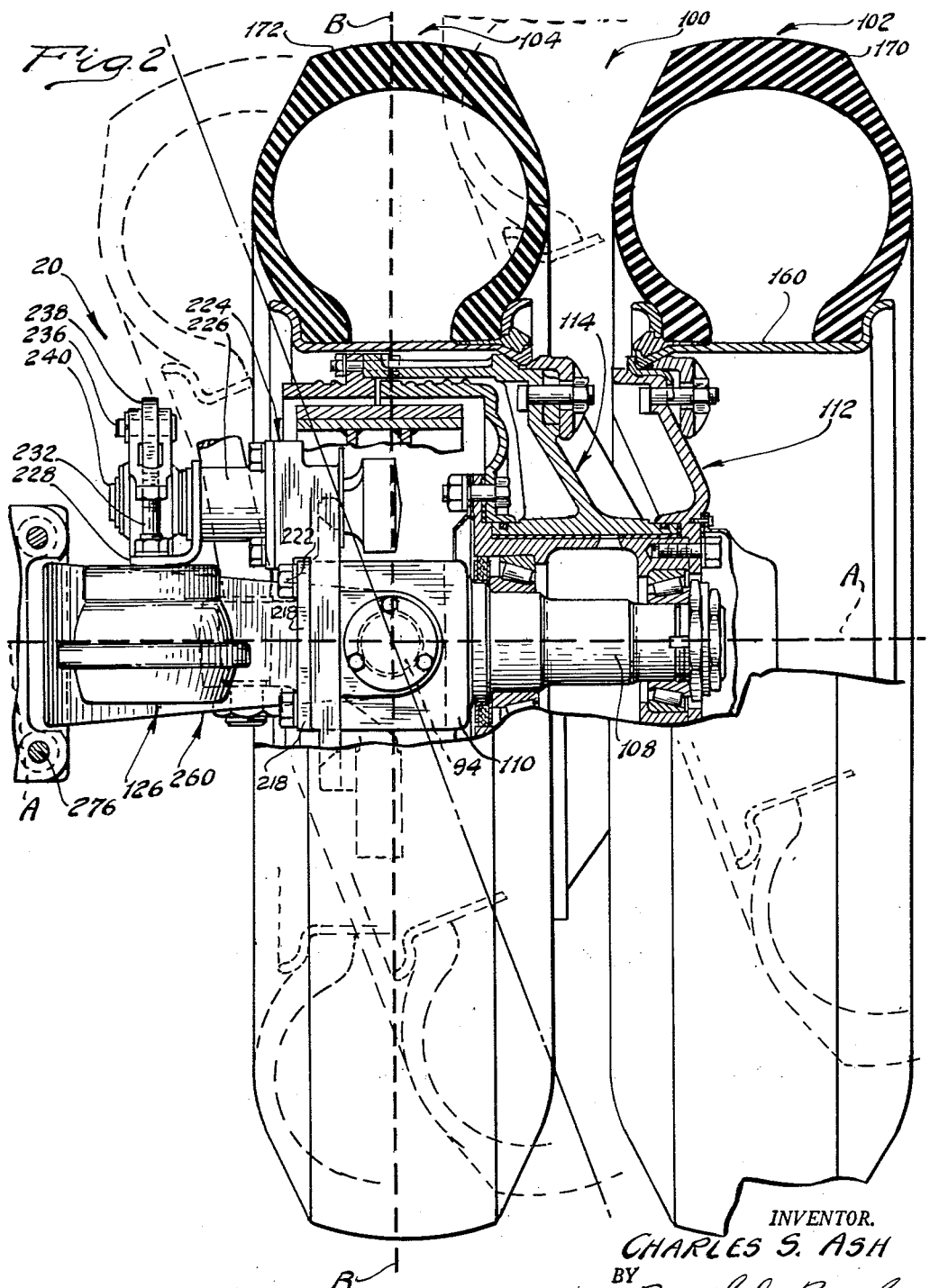

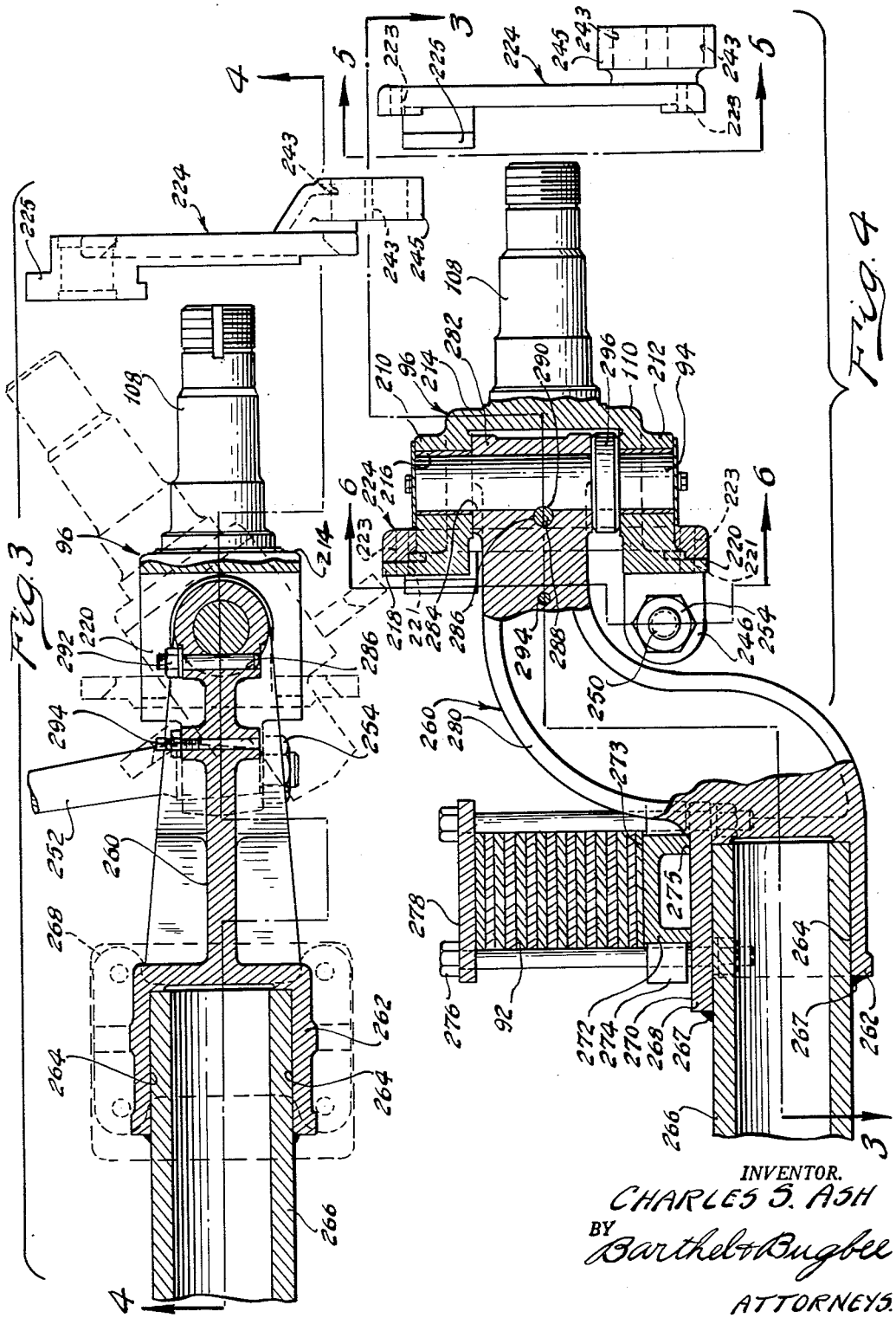

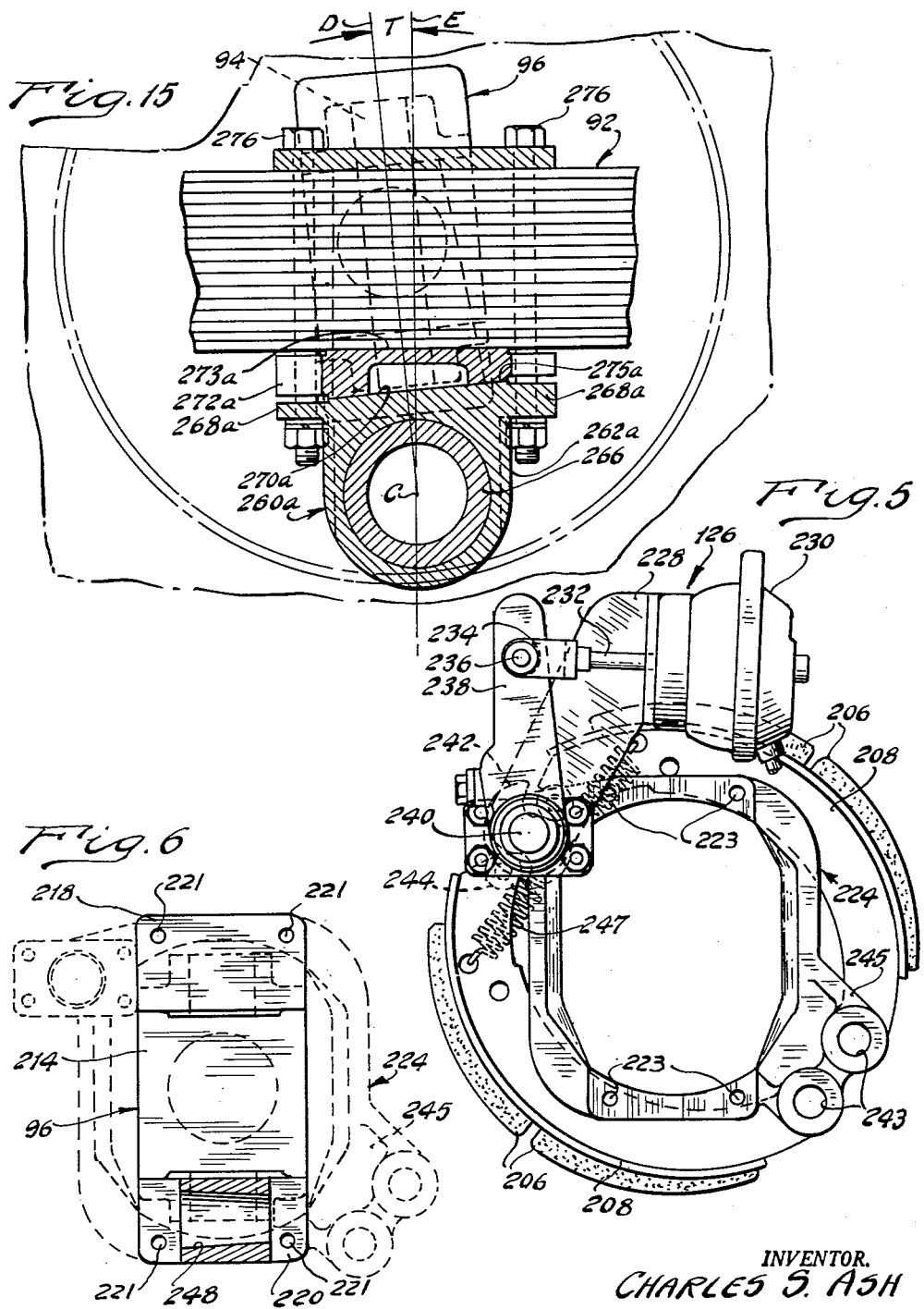

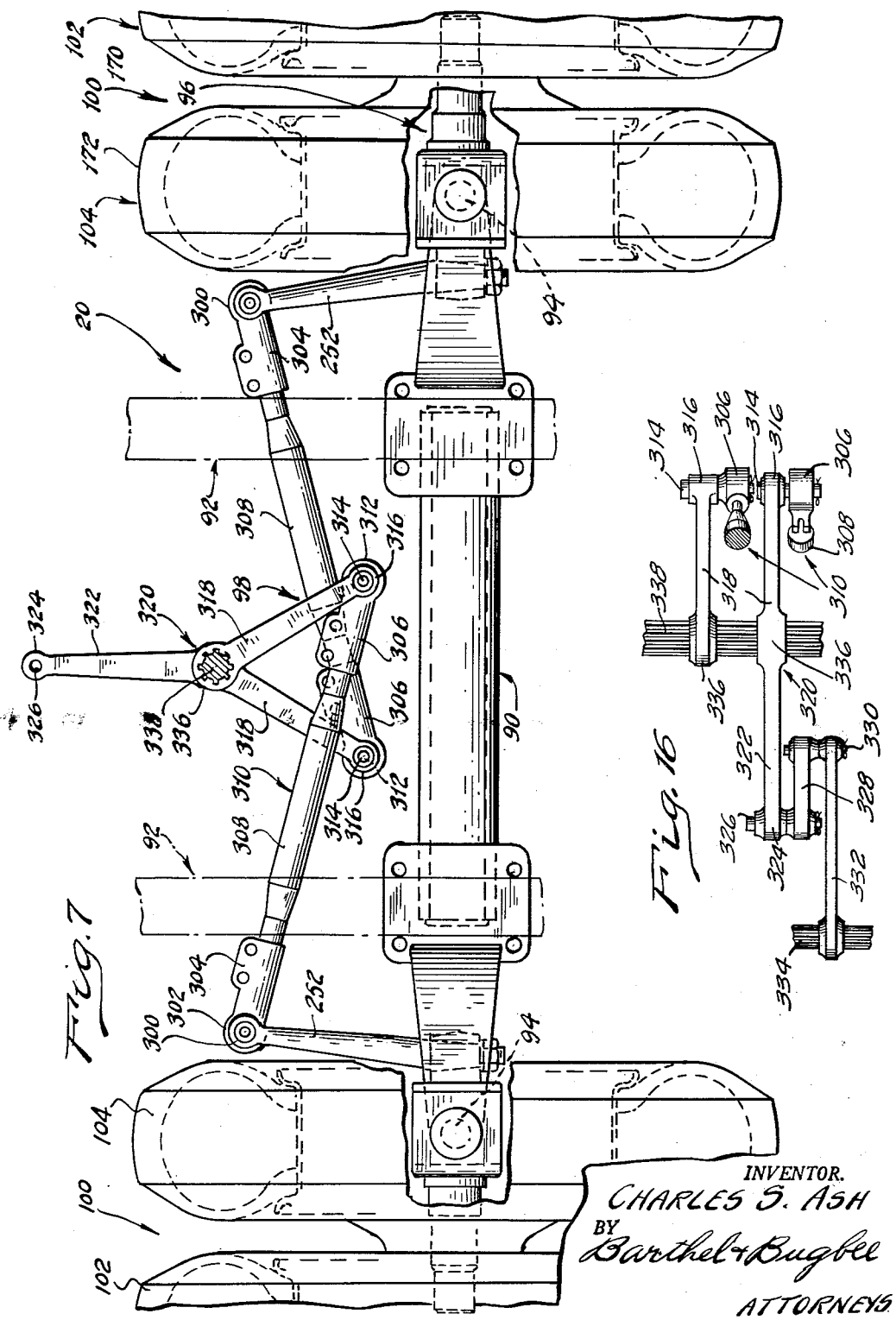

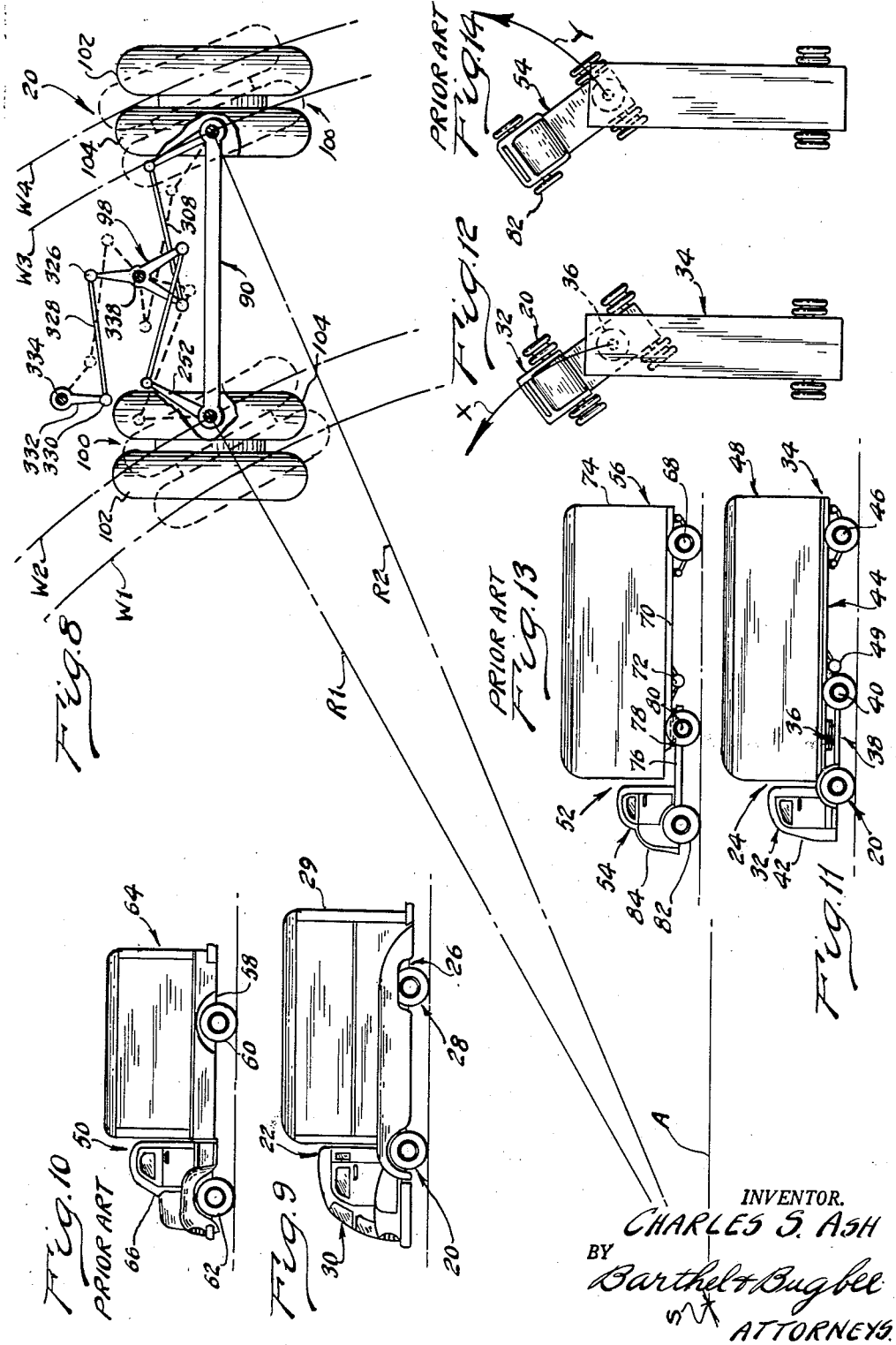

3,154,315
DIFFERENTIAL DUAL FRONT WHEEL VEHICLE
Charles S. Ash, 220 Wixom Road, Milford, Mich.
Filed July 19, 1961, Ser. No. 125,144
4 Claims. (Cl. 280—96.3)

This invention relates to motor vehicles and, in particular, to a motor vehicle chassis with dual steerable front wheels, either trucks or tractor-trailer combinations.

One object of this invention is to provide an independently-rotatable dual front wheel installation for a motor vehicle chassis, either truck or tractor, which permits the driver's cab to overhang the front axle and thus be placed much farther forward than in conventional vehicles, thereby enabling the front wheels to be more heavily loaded than heretofore and permitting greater overall loads to be carried, yet facilitating easier steering and steering gear maintenance and giving greatly increased road contact and consequently much greater braking capacity than is possible with prior vehicles equipped with single front wheels.

Another object is to provide an independently-rotatable dual front wheel installation of the foregoing character wherein the front wheels are independently rotatable dual front wheels so that each wheel and its tire rotates freely relatively to the front wheel and tire with which it is paired, thereby greatly reducing tire wear while greatly increasing vehicle mobility and maneuverability.

Another object is to provide an independently-rotatable dual front wheel installation for a motor vehicle chassis of the foregoing character wherein the front axle structure or assembly has a tubular main portion to the opposite ends of which are welded upraised one-piece axle end members upon which the vehicle-supporting springs are directly mounted, thereby supporting the load directly upon the axle end members, without transmitting it primarily through the welds, the axle end members also carrying the kingpins pivotally supporting the steerable front axle yokes and brake actuators thereon.

Another object is to provide an independently-rotatable dual front wheel installation as set forth in the object immediately proceeding, wherein each front axle yoke on the opposite side of the kingpin from the wheel axle pin carries an open-centered approximately rectangular ring which serves as a reinforcing member for tying together and strengthening the opposite free ends of the yoke and also for carrying the brake actuator.

Another object is to provide an independently-rotatable dual front wheel installation, as set forth in the object immediately preceding, wherein the front axle assembly on its opposite end members is provided with kingpins disposed substantially vertical and with their axes substantially parallel and vertical to one another, thereby facilitating swinging of the wheels horizontally relatively to the axle end members during steering and reducing the steering effort required.

Another object is to provide an independently-rotatable dual front wheel installation wherein the dual front wheels are so mounted relatively to the kingpin that the central plane of the inner wheel tire is substantially coincident with the kingpin axis, while the outer wheel rotates outboard of but independently and freely relatively to the inner wheel.

Other objects and advantages of the invention will become apparent during the course of the following description of the accompanying drawings, wherein:

FIGURE 2 is a top plan view, partly in central horizontal section, of the installation shown in FIGURE 1;

FIGURE 3 is a horizontal section through one end of the front axle structure, kingpin, steering yoke and steering arm, with the dual front wheels removed and with the steering yoke reinforcing ring additionally shown separated from the remainder of the assembly in order to clarify the disclosure, taken along the stepped line 3—3 in FIGURE 4;

FIGURE 4 is a vertical section, partly in rear elevation, of the front axle assembly shown in FIGURE 3, taken along the stepped line 4—4 therein, with the reinforcing ring likewise additionally shown as separated from the remainder of the assembly:

FIGURE 5 is an elevational view of the steering axle yoke reinforcing ring, looking in the general direction of the line 5—5 in FIGURE 4, but with the brake shoes and brake actuator added;

FIGURE 6 is a vertical section, mainly in inner end elevation, of the steering axle yoke, taken along the line 6—6 in FIGURE 4 but with the axle end member omitted in order to clarify the disclosure and with the reinforcing ring shown in dotted lines;

FIGURE 7 is a somewhat diagrammatic top plan view of the dual front wheel and steering linkage installation, as shown fragmentarily in FIGURES 1 to 5 inclusive, with the inner wheels centrally broken away to disclose the steering axle yokes, kingpins and steering arms:

FIGURE 8 is a top plan view similar to FIGURE 7 but on a reduced scale, showing the geometrical action involved in steering;

FIGURE 9 is a side elevation of a truck equipped with an independently-rotatable dual front wheel installation according to the present invention, showing how the load-carrying truck body is disposed with its front end almost over the front axle, and with the driver's cab overhanging the front axle, as accomplished by the present invention;

FIGURE 10 is a side elevation of a conventional truck with single front wheels incapable of carrying an adequate load on the front wheels and therefore requiring the body and cab to be set back toward the rear axle;

Figure 1:
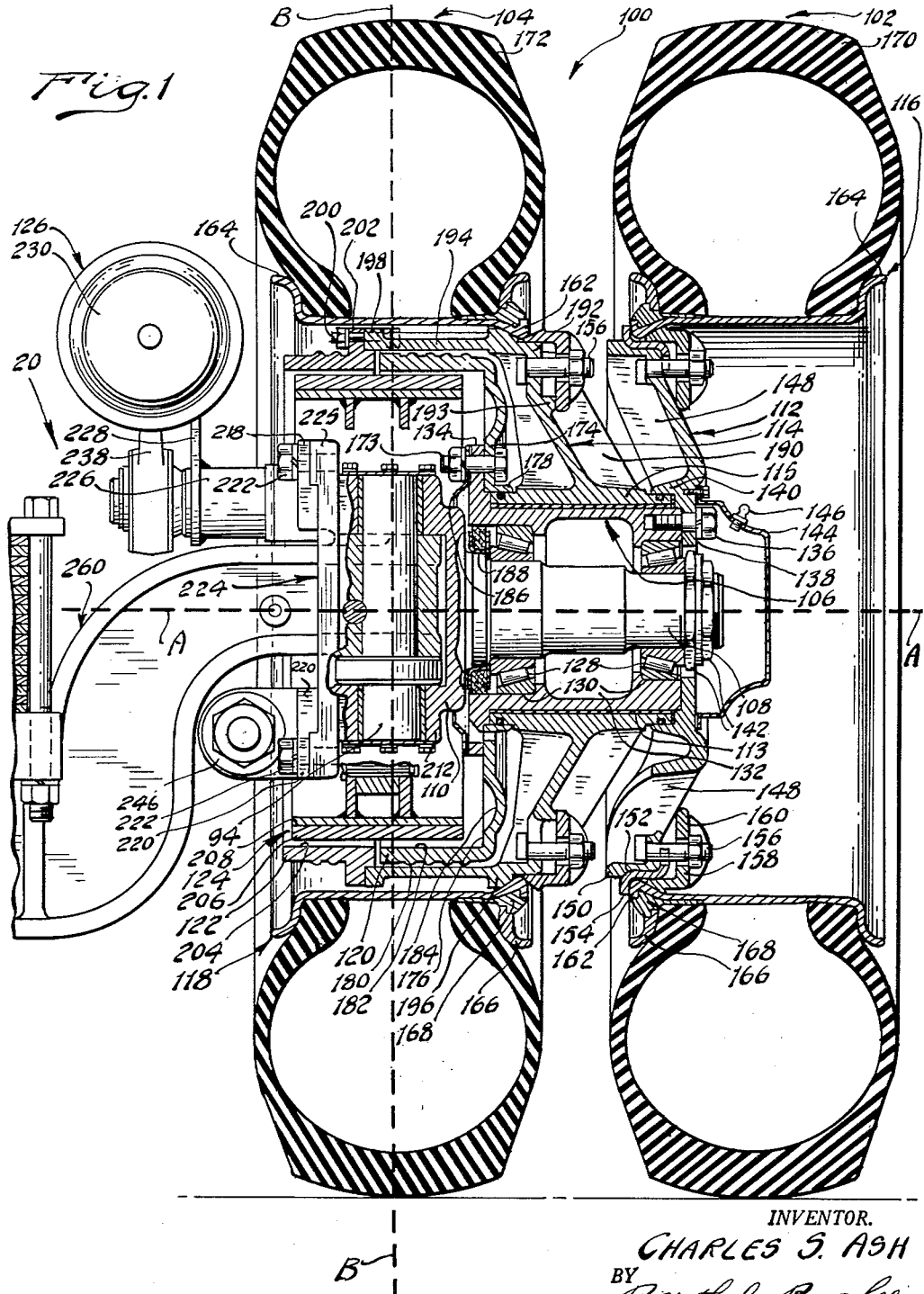
FIGURE 1 is an enlarged central vertical section through an independently-rotatable dual front wheel installation, looking forward, with the axle end member, brake actuator and steering arm in rear elevation.

FIGURE 11 is a side elevation similar to FIGURE 9 but showing a tractor-trailer combination according to the present invention equipped with an independently-rotatable dual front wheel installation which because of the greater permissible load impostion upon the dual front wheels enables forward shifting of the "fifth wheel" or coupling device to a position approximately midway between the tractor front and rear wheels and enabling the use of an overhanging cab;

FIGURE 12 is a top plan view of the tractor-trailer combination of FIGURE 11, according to the present invention, showing diagrammatically the improved cornering action thereof in making, for example, a left turn;

FIGURE 13 is a side elevation of a conventional tractor-trailer combination with the "fifth wheel" approximately over the tractor rear axle and with a rearwardly-shifted cab and truck body necessitated by the inadequate loading-carrying capacity of the single front wheels of the tractor;

FIGURE 14 is a top plan view of the conventional tractor-trailer combination shown in FIGURE 13, showing diagrammatically the "jackknifing" or lateral skidding inherent in the conventional location of the "fifth wheel" substantially over the tractor rear axle;

FIGURE 15 is a fragmentary cross-section looking outward toward the left-hand steering knuckle, through a modified spring and front axle structure mounting of the left-hand front spring which imparts caster or slight backward tilting to the kingpin; and FIGURE 16 is a side elevation, partly in section, of the upper central portions of FIGURES 7 and 8.

Hitherto, conventional motor transport vehicles with steerable single front wheel installations have been subject to the defect of inadequate load-carrying capacity for the single front wheels, thereby requiring the weight of the load to be shifted rearwardly in a truck or to be coupled by a fifth wheel approximately over the tractor rear axle of a tractor-trailer combination, in order to avoid overloading the tires of the single front wheels. This arrangement, however, brought in the further danger of "jackknifing" or lateral skidding of the tractor in response to the sudden application of the brakes or as the result of a sudden sharp skid or abrupt turn. Such prior motor transport vehicles also required considerable caster and camber or lateral and longitudinal tilt respectively of the kingpins in order to bring about proper steering action, but this in turn required the front end load to be lifted and lowered by the steering mechanism or linkage in making successive turns in opposite directions. The present invention provides an independently-rotatable dual front wheel installation which eliminates these disadvantages of prior single front wheel motor transport vehicles and fulfills the objects and advantages set forth briefly above and in more detail below.

Gneral Arrangement of Present Invention

Referring to the drawings in detail, FIGURES 1 to 9 inclusive and 11 show an independently rotatable dual front wheel installation, generally designated 20, shown externally in top plan view in FIGURES 7 and 8, as applied to a motor truck 22 in FIGURE 9 and to a tractor-trailer combination 24 in FIGURE 11. The motor truck 22 (FIGURE 9) according to the present invention consists generally of a chassis 26 equipped with a conventional rear wheel and axle assembly 28 driven by a conventional engine and power transmission mechanism (not shown) and carrying a load-transporting body 29 of any suitable type and a forwardly-projecting driver's cab 30 overhanging the dual front wheel installation 20.

The tractor-trailer combination 24, according to the present invention, consists generally of a tractor 32 and semi-trailer 34 coupled thereto by a conventional "fifth wheel" 36. The tractor 32 in turn consists generally of a chassis 38 equipped with a conventional rear wheel and axle assembly 40 driven by a conventional engine and power transmission mechanism (not shown) and carrying a fifth wheel 36 approximately midway between the independently-rotatable dual front wheel installation 20 and the rear wheel and axle assembly 40. The chassis 38 also carries a forwardly-projecting driver's cab 42 overhanging the dual front wheel installation 20 in cantilever fashion.

General Arrangement of Contrasting Prior Art Vehicles

The semi-trailer 34 is conventional and consists generally of a chassis 44 having a rear wheel and axle assembly 46 mounted on the rearward end thereof and coupled to the tractor chassis near its forward end by the fifth wheel 36. The semi-trailer chassis 44 also carries a load-transporting body 48 and a conventional prop 49 for supporting the forward end portion of the semi-trailer 34 when uncoupled from the tractor 32.

The vehicles shown in FIGURES 9 and 11, according to the present invention, are illustrated broadly without details for the purpose of contrasting them with a prior art or conventional motor truck, generally designated 50 (FIGURE 10) and a prior art tractor-trailer combination 52 (FIGURE 13). The latter consists generally of a conventional tractor 54 and semi-trailer 56 coupled thereto. For purposes of comparison and contrast, the prior art motor truck 50 consists generally of a chassis 58 carrying a rear wheel and axle assembly 60, a single front wheel installation 62, a load-transporting body 64 and a driver's cab 66 which only slightly overhangs the single front wheel installation 62, because of the necessity of avoiding overloading the tires of the latter.

The conventional semi-trailer 56 of the prior art tractor-trailer combination 52 (FIGURE 13) carries a rear wheel and axle assembly 68 mounted on a semi-trailer chassis 70 equipped with a conventional prop 72 and carrying a load-transporting body 74. The conventional semi-trailer 56 is coupled to the chassis 76 of the conventional tractor 54 by a conventional fifth wheel 78 mounted substantially over the tractor rear wheel and axle assembly 80 carried at the rearward end of the tractor chassis 76. The tractor chassis 76 as its forward end carries a single front wheel installation and a driver's cab 84 mounted above and mostly rearwardly of the single front wheel installation 82. It will be understood that the word "single" as applied to the truck front wheel installation 62 and the tractor front wheel installation 82 is used in the sense of single wheels mounted at the opposite ends of the front axle and not in the sense of a single wheel only mounted in the center of the front of the chassis, as in certain prior three-wheeled vehicles of a mostly obsolete type.

Independently-Rotatable Dual Front Wheel Installation

The improved independently-rotatable dual front wheel installation, generally designated 20, of the present invention shown broadly in FIGURE 7 and in more detail in FIGURES 1 to 6 inclusive includes a front axle structure, generally designated 90, yieldably supported by spring assemblies 92 from the vehicle frame (not shown) and in turn carrying at its opposite ends kingpins 94 upon which steerable knuckle-spindle units 96 are pivotally mounted, and (FIGURE 7) operated by a steering linkage 98 from the usual steering wheel and its shaft (not shown). Rotatably mounted upon each knuckle-spindle unit 96 (FIGURES 1 and 2) is a braked differential dual wheel unit, generally designated 100, including outer and inner braked wheel assemblies 102 and 104, supported by an internal tubular hub 106 rotatably mounted upon the spindle 108 of each knuckle-spindle unit 96. The spindle 108 is integrally connected to the steering knuckle or yoke 110 which in turn is pivotally mounted on the kingpin 94. The outer and inner braked wheel assemblies 102 and 104 also include outer and inner wheels 112 and 114, the outer wheel 112 being bolted to and rotating with the internal hub 106. Rotatably mounted on the internal hub 106 by the intermediate agency of a sleeve bearing 113 is the external hub 115 of the inner wheel 114. The outer and inner wheels 112 and 114 carry outer and inner rim assemblies 116 and 118 respectively.

The outer and inner wheel assemblies 102 and 104 (FIGURE 1) are braked by outer and inner brake drums 120 and 122 respectively which in turn are engaged by a common braking unit 124 operated by a brake actuator 126. The internal hub 106 which supports both wheel assemblies 102 and 104 is rotatably supported upon the spindle 108 by anti-friction bearing units 128 with inner races mounted upon the spindle 108 in axially-spaced relationship to one another and with outer races mounted in annular seats or rabbets 130 in the thickened opposite ends of the internal hub 106. Lubricant supplied to an annular chamber 132 surrounding the spindle 108 between the anti-friction bearings 128 is conveyed to the sleeve bearing 113 through peripherally-spaced holes (not shown) in the central portion of the internal hub 106.

The internal hub 106 at its inner end (FIGURE 1) is provided with a radial bolt-on flange 134 which also serves as a retaining abutment for the inner end of the external hub 115. The outer end of the internal hub 106 is drilled and threaded at circumferentially-spaced locations therearound on parallel axes to receive cap screws 136 threaded therein and by which the outer wheel 112 is bolted to the internal hub 106 through a similarly-drilled radial flange 138 on the outer wheel 112. The outer wheel 112 adjacent the radial flange 138 is provided with an axial flange 140 overhanging the outer end of the external hub 115 of the inner wheel 114 and covering an annularly-grooved portion therein adapted to receive a conventional O-ring (not shown). The outer end of the spindle 108 is threaded to receive lock nuts 142 by which the wheel assembly 100 is held in position upon the spindle 108 by direct engagement of the inner race of the outer anti-friction bearing unit 128 (FIGURE 1). A hub cap 144 is bolted to the outer wheel 112 adjacent the flange 138 and is drilled and threaded to receive a plug or fitting 146 through which lubricant is introduced into the interior of the hub cap 144 and thence through the spaces between the rollers of the anti-friction bearing units 128 into the central lubricant space 132.

The outer wheel 112 is notched and radially flanged peripherally at circumferentially-spaced intervals to provide circumferentially-spaced spokes 148 (FIGURE 1), the axially-bent outer end portions 150 of which are disposed substantially parallel to the axis A—A of the spindle 108. The outer end portions 150 of the spokes 148 are recessed at 152 to receive rim abutment members 154 notched for the passage of bolts 156. The outer wheel 112 is drilled at circumferentially-spaced intervals near the flattened angled outer end portions 150 of the spokes 148 to receive bolts 156. The bolts 156 also pass through the similarly-drilled radial flange 158 (FIGURE 1) of an annular rim clamp 160 of L-shaped cross-section which is wedge-shaped in cross-section to engage and urge the correspondingly-bevelled inner end portion 162 of the outer rim assembly 116 against the rim abutment members 154. The rim assemblies 116 and 118 are conventional and similarly constructed, hence a single description and the same corresponding reference numerals will suffice for both. Each has a rounded fixed flange 164 at one edge and a removable flange ring 166 at its opposite edge engaged by a locking ring or band 168 disposed between the removable rim flange 166 and the bevelled inner edge portion 162. A conventional outer and inner set of tires 170 and 172 are mounted on the outer and inner rim assemblies 116 and 118 with their beads engaging the rounded rim flanges 164 and 166 thereof in the usual way. The usual inner tubes and their inflation stems (not shown) are provided, the rim assemblies 116 and 118 being drilled for the passage of the latter, these conventional parts having been omitted to avoid further complicating the drawings.

The radial bolt-on flange 134 of the internal hub 106 (FIGURE 1) is drilled at circumferentially-spaced intervals to receive bolts 173 which secure the correspondingly-drilled central flange 174 of the web 176 of the outer brake drum 120 to the flange 134. The flange 174 at its inner edge is axially flanged at 178 to overlap and cover the annularly-grooved inner end of the external hub 115 and to engage a conventional O-ring therein (not shown) in sealing relationship. The outer brake drum 120 has a cylindrical peripheral drum wall 180 provided with a cylindrical internal braking surface 182. The outer brake drum web 176 has an annular expansion bulge 184 between the cylindrical portion 180 and the bolt-on flange 174 to permit radial expansion of the web 176 in response to the frictional heating thereof by the braking action, thereby preventing the conical deformation of the cylindrical brake drum wall 180 by the use of a solely radial web 176 without the annular expansion bulge 184. Also secured to the bolt-on flange 134 of the internal hub 106 is a frusto-conical shield 186 which engages the knuckle or yoke 110 near its junction with the spindle 108 to exclude dust. A conventional annular oil seal device 188 is pressed into the annular space (FIGURE 1) between the spindle 108 and the annular seat 130 adjacent the steering knuckle 110.

The external hub 115 is integral with the inner wheel 114 (FIGURE 1) and the inner wheel 114, like the outer wheel 112, is peripherally notched at circumferentially-spaced intervals and radially flanged to provide spokes 190, the upper ends of which, like the outer wheel spokes 148, have flattened angled outer end portions 192 similarly drilled to receive similar bolts 156 similarly passing through a similar annular rim clamp 160 of L-shaped cross-section with a wedge-shaped end engaging and urging the correspondingly-bevelled inner end portion 162 of the similar inner rim assembly 118 in the manner described above in connection with the outer rim assembly 116. Similar reference numerals are therefore used for corresponding parts.

The inner wheel spokes 114 (FIGURE 1) near their angled outer end portions 192 have abutment lugs 193 thereon. The end portions 192, unlike the angled outer end portions 150 of the outer wheel spokes 148, have elongated extensions 194 (FIGURE 1) with rim abutment and coupling enlargements 196 and 198 respectively at its opposite ends, the enlargement 196 being wedge-shaped to cooperate with the abutment lug 193, the rim portion 162 and wedge-shaped annular rim clamp 160 in effecting the clamping action. The outer end portion or coupling enlargement 198 of the extension 194 is drilled at circumferentially-spaced locations to receive bolts 200 passing through the similarly-drilled outwardly-projecting bosses or flanges 202 on the periphery of the inner brake drum 122. In this manner, the inner brake drum 122 is coupled to the spoke end portions 192 of the inner wheel 114. The inner brake drum 122 has a cylindrical internal braking surface 204 which, with the outer brake drum braking surface 182, is engaged by the brake lining 206 secured to the arcuate brake shoes 208 (FIGURE 5). The mechanism which operates the brake shoes 208 of the braking unit 124 is conventional, except for its mounting arrangement. The independently-rotatable dual front wheel construction and the brake drum mounting arrangements just described are disclosed and claimed in my prior Patent No. 2,988,400, issued June 13, 1961, for Demountable Rim Differential Dual Wheel Construction.

According to the present invention, however, the wedge-shaped rim abutment enlargements 196 are so located in an axial direction along the axis A—A of the spindle 108 that the inner rim assembly 118 clamped thereagainst locates the central plane B—B substantially coincident with the axis of the kingpin 94. This feature greatly facilitates steering, in contrast to prior independently-rotatable dual wheel installations wherein both the outer and inner wheels had central planes of their rims and tires disposed outward of their respective kingpins, with consequently increased resistance to steering.

*Steering Knuckle and Brake Actuator Construction*

The steering knuckle or yoke 110 upon which each of the front wheel spindles 108 is mounted is approximately C-shaped with upper and lower bearing arms 210 and 212 respectively (FIGURES 1, 3, 4 and 6) which are interconnected by a bridge portion 214 and bored coaxially to receive suitable kingpin bearings 216. These may be either plain bearings, as shown for simplicity in FIGURES 1 and 4, or anti-friction bearings, as desired. The upper and lower bearing arms 210 and 212 have inwardly-extending flat-faced attachment bosses 218 and 220 respectively, which are suitably drilled at 221 for receiving bolts 222. Secured by the bolts 222 to the upper and lower bosses 218 and 220 on the side thereof adjacent the kingpin 94 is a combined mounting and coupling ring 224 of open-centered rectangular shape (shown dotted in FIGURE 6 and solid in FIGURES 1, 2, 3, 4 and 5) and similarly drilled at 223.

Bolted to an upper corner boss 225 (FIGURES 3 and 4) on the coupling ring 224 is the flanged tubular support 226 (FIGURES 1, 2 and 5) of the brake actuator 126. Welded to the support 226 is an upwardly-inclined bracket 228 to the upper end of which is bolted a conventional brake-actuating fluid pressure motor 230 having a reciprocable piston rod or plunger 232, the end yoke 234 of which (FIGURE 5) is pivoted at 236 to a lever arm 238, the lower end of which is mounted on and drivingly secured to a brake operating shaft 240.

One of the lower corners of the coupling ring 224 has a boss 245 thereon bored at 243 to receive pivot pins (not shown). As a consequence, operation of the motor 230 and reciprocation of the rod 232 swings the lever arm 238 to rotate the shaft 240 and cam 242 thereon to force the rollers 244 on the free ends of the brake shoes 208 apart from one another so as to swing the brake shoes 208 away from one another against the tension of the spring 247, thus applying the brake linings 206 simultaneously to the outer and inner brake drums 120 and 122 respectively.

The lower attachment boss 220 on the lower bearing arm 212 has an extension 246 which is provided with a tapered horizontal bore 248 (FIGURE 6) which receives the correspondingly-tapered and threaded rearward end 250 of a forwardly-extending steering arm 252 (FIGURE 3) held in assembly therewith by a retaining nut 254. The steering linkage 98, of which the steering arms 252 form a part, is described below following the description of the front axle structure 90.

*Front Axle Structure*

The front axle structure 90 consists generally of laterally-spaced upraised one-piece axle end members 260 having hollow inner end portions 262 provided with sockets 264 (FIGURES 3 and 4) in which the opposite ends of a tubular central front axle member 266 are inserted and welded or otherwise secured, as at 267. The upper sides of the inner end portions are flanged and flattened to provide integral pads 268 with flat seats 270 for receiving spacers 272 (FIGURE 4) upon which the vehicle spring assemblies 92 are supported, and having parallel upper and lower surfaces 273 and 275. The pads 268 and boss 274 of the spacers 272 are drilled in alignment to receive holddown bolts 276 which also pass throught holddown plates 278 above the spring assemblies 92 to secure the latter to the pads 268. In this manner, the load is carried directly on the pads 268 of the end portions 262 of the forgings constituting the upraised axle end members 260 and transmitted directly therethrough to the spindles 108 and outer and inner wheel assemblies 102 and 104 without passing through the welded joints between the end members 260 and tubular central axle member 266.

The upraised central or connecting portion 280 of each axle end member 260 (FIGURE 4), as its name indicates, extends upwardly from the inner end portion 262 to the enlarged head 282 on the outer end thereof. The latter is bored vertically as at 284 to snugly but removably receive the kingpin 94, and is also bored horizontally as at 286 to receive a tapered retaining pin 288 which by passing through the kingpin notch 290 forming a continuation of the tapered bore 286 retains the kingpin 94 in position. The smaller diameter end of the retaining pin 288 (FIGURE 3) is threaded to receive a retaining nut 292. The portion 280 of the end member 260 is also horizontally drilled and threaded near the tapered bore 296 to receive a lock-nut-equipped stop screw 294. An annular anti-friction thrust bearing 296 is interposed between the head 282 and the lower arm 212 of the steering knuckle 110 to sustain the thrust arising from load transfer therebetween.

*Steering Linkage*

The steering linkage 98 (FIGURE 7) by which the steering knuckle spindle units 96 are swung horizontally to and fro in steering the vehicle include the steering arms 252 described above. The steering arms 252 are angled slightly toward one another in converging relationship (FIGURE 7) so as to avoid conflicting with the inner wheel assemblies 104, when the arms project forwardly rather than rearwardly as in conventional steering linkages. The bosses 300 on the forward ends of the forwardly-extending steering arms 252 cooperate with the outer ends 302 upon outer heads 304 in either ball-joint or pivot yoke or pivot pin construction to provide a pivotal connection therebetween. The outer heads 304 are connected to inner heads 306 by rods 308 to form links, generally designated 310, which cross one another or overlap. The inner heads 306 have ends 312 which are pivotally connected as at 314 to the rearward ends 316 of the independently adjustable dual arms 318 of a Y-lever, generally designated 320, having a forwardly-extending arm 322 with a coupling boss 324 at the forward end thereof. The coupling boss 324 is drilled for a pivotal connection 326 to the link 328 (FIGURE 8) which in turn is pivoted at 330 to the crank arm 332 of the steering mechanism by which motion is transmitted from the steering wheel and steering wheel shaft 334 to the Y-lever 320 assisted by a conventional power steering device and reduction gearing (not shown). The hubs 336 of the arms 318 of the Y-lever 320 are bored and splined to receive a vertical pivot spline shaft 338 which lockingly couples the hubs 336 and their arms 318 to one another while enabling the angle therebetween to be adjusted. The spline shaft 338 extends upward and has a pivotal mounting (not shown) upon the vehicle chassis 38 (FIGURE 11) or 26 (FIGURE 9).

*Modified Vehicle Spring and Axle Mounting*

As stated above, the vehicle spring and axle mounting arrangement shown in FIGURE 4 employs a spacer 272 with parallel upper and lower surfaces 273 and 275 so that the kingpin 94 has its axis disposed substantially vertical or, in the technical language of automotive engineering, without "caster" or longitudinal tilt. When conditions recommend such caster in order to tilt the kingpins rearwardly, the slightly modified arrangement shown in FIGURE 15 is used. The section in FIGURE 15 shows the left front spring mounting, looking outward toward the left steering knuckle, with the spring leaves, however, shown in side elevation. To show the relationship of the modified arrangement of FIGURE 15 to the arrangement of FIGURE 4, the same reference numerals are used in the latter for corresponding but slightly modified parts followed by the suffix "a." Unmodified parts, however, bear the same reference numerals in FIGURE 15 as in FIGURE 4.

In the modified construction of FIGURE 15, the central tubular axle member 266 of FIGURE 15 remains the same, but the inner end portion 262a has an integral pad 268a thereon with a forwardly and downwardly inclined flat seat 270a adapted to be engaged by the similarly lower surface 275a which converges forwardly toward the upper surface 273a of the spacer 272a. The latter thus is of wedge-shaped cross-section (FIGURE 15) rather than parallel-surfaces, as in the spacer 272 of FIGURE 4. The angle between the upper and lower surfaces 273a and 275a represents the caster angle or angle of rearward tilt T between the axis DC of the kingpin 94 and the vertical direction EC. This angle of tilt or caster T is of the order of approximately five degrees in a particular installation. The remaining characteristics of the modified arrangement of FIGURE 15 are substantially the same as those of FIGURE 4. In both arrangements of FIGURES 4 and 15, however the axes of the kingpins 94 are substantially parallel, so that they are substantially without "camber" or lateral tilt relatively to one another in a lateral plane of the vehicle, according to the terminology used in the automotive vehicle art.

*Operation*

In the operation of the independently-rotatable dual front wheel installation 20 of FIGURES 1 to 9 inclusive, 11 and 12, let it be assumed that the independently-rotatable dual front wheel units 100 consisting of the outer and inner wheel assembiles 102 and 104 are positioned parallel to the center line of the vehicle chassis or perpendicular to the cross axis of the front axle structure 90, as shown in FIGURE 7, and that the forward end 324 of the Y-lever 320 is connected to the steering wheel shaft 334 and steering wheel (not shown) within the driver's cab 30 (FIGURE 9) or 32 (FIGURE 11). With the vehicle moving forward, in order to make the left-hand turn shown in FIGURE 12, counterclockwise rotation of the steering wheel and its shaft 334 and crank arm 332 (FIGURES 7 and 8) causes the Y-lever 320 to rotate clockwise around its pivot shaft 330. The consequent leftward swinging of the lever arms 318 is transmitted through the links 319 to the steering arms 252 to swing the latter and the inner ends of the steering knuckles or yokes 110 to the left around their respective kingpins 94. The momentarily leading edges of the outer and inner wheel assemblies 102 and 104 at both ends of the axle structure 90 are thus swung to the left around their respective kingpins 94, causing the vehicle 22 or 24 to turn to the left. Meanwhile, the outer wheels 112 rotate freely relatively to the spindles 108 by the rotation of the internal hubs 106 on the anti-friction bearing assemblies 128. At the same time, the inner wheel assemblies 104 rotate relatively to or independently of the outer wheels 102 by reason of the independent rotation of their external hubs 115 on the bearings 113 between them and the internal hubs 106.

FIGURE 8 shows in dotted lines the four arcs W-1, W-2, W-3 and W-4 along which the four front wheels travel in making this left-hand turn, and the two radii R-1 and R-2 therefrom to the center S of the turn being made. The center S is also intersected by the axis A of the rear axle 60. The outside wheels of course turn on arcs of longer radii than the inside wheels, due to the geometry of the situation.

Due to the fact that the dual front wheel construction of the present invention has enabled the fifth wheel 36 to be mounted forwardly of the rear axle 40 of the tractor 32 (FIGURES 11 and 12) by reason of the greater load distribution permitted upon the dual front wheel installation 20, the semi-trailer 34 follows and tracks properly, as indicated by the longitudinal arcuate arrow X in FIGURE 12, with the tractor 32 without tendency toward excessive rearward lateral skidding or jackknifing of the tractor-trailer combination, such as occurs in the single front wheel prior art tractor 54 of FIGURE 14, as indicated by the arcuate lateral arrow Y therein. This improved action of the applicant's invention also causes the load to hold down the dual front wheel installation 20 more firmly against the road bed than hitherto. This in turn results in increased ground contact areas of the outer and inner tires 170 and 172, decreasing the tendency to skid and increasing the braking action when the operator energizes the fluid pressure motors 230 of the brake actuators 126 to engage the brake linings 206 of the brake shoes 200 with the outer and inner brake drums 120 and 122 respectively. Ease of steering is further facilitated by the fact that the central planes B—B of the inner wheel assemblies 104 substantially coincide with the axes of the kingpins 94 (FIGURE 1).

During operation, while the inner wheel assemblies 104 are turning substantially on the axes of their respective kingpins 94 (FIGURES 1 and 7), the outer wheel assemblies 102 are rotating independently while swinging on radii centered at the kingpin axes. Meanwhile, the front axle end members 260 transmit the load carried by the vehicle from the springs 92 to the yokes 110 and spindles 108 by way of the thrust bearings 296 without substantially transmitting such load through the welded joints 267. The coupling rings 224 at the same time prevent spreading of the upper and lower arms 210 and 212 of the yokes 110 relatively to their bridge portions 214, thereby greatly increasing the structural strength as well as providing mounts for the brake actuators 126.

During the same turning operation, the geometry of the steering linkage, as indicated diagrammatically in FIGURE 8, causes properly related swinging of the various swinging parts, as indicated by the dotted lines in FIGURE 8. The crossed or overlapping steering linkage 98 (FIGURES 7 and 8), by reversing the steering geometry, enables the steering linkage 98 to be mounted forwardly of the axle structure 90 where it is in the most convenient position for repair and maintenance.

The operation of the braked independently-rotatable dual front wheel installation 20 as applied to a truck 22 (FIGURE 9) is similar to that described above in connection with the operation of the semi-trailer 24 of FIGURES 11 and 12, except that jackknifing action or lateral skidding, of course, is not present in the truck 22. Increased ground contact of the tires 170 and 172 is also accomplished in the truck 22, with consequently enhanced braking action and decreased tendency toward skidding. This arises from the ability, in the truck 22, to move the center of gravity of the load farther forward without overloading the front wheels than is possible with the conventional truck 50 with single front wheels 62.

What I claim is:

1. A reinforced front wheel axle construction for vehicles comprising a front wheel axle structure having opposite end portions, kingpins mounted in said opposite end portions, steering knuckles pivotally mounted on said kingpins and including spaced arms engaging said kingpins and a wheel spindle projecting laterally from each steering knuckle, and an open-centered reinforcing member secured to and interconnecting the outer ends of the arms of each steering knuckle, said axle end portions projecting outwardly through the open centers of their respective reinforcing members, said reinforcing member being secured to the steering knuckle arms on the opposite side of the kingpin from the wheel spindle.

2. A reinforced front wheel axle construction for vehicles, according to claim 1, wherein the steering knuckle has an extension on one of its arms and wherein a steering arm is secured to said extension.

3. A reinforced front wheel axle construction for vehicles, according to claim 2, wherein the steering arm is secured to the extension on the side opposite the reinforcing member.

4. A reinforced front wheel axle construction for vehicles, according to claim 1, wherein the wheels are provided with brake units and brake-operating mechanism connected thereto and wherein a brake actuator motor is mounted on said reinforcing member and operatively connected to said operating mechanism.

References Cited in the file of this patent

UNITED STATES PATENTS

| 811,076 | Miller | Jan. 30, 1906 |
| 1,705,529 | Mooers | Mar. 19, 1929 |
| 1,762,714 | Dodge | June 10, 1930 |
| 2,182,560 | Higbee | Dec. 5, 1939 |
| 2,247,725 | Ferguson | July 1, 1941 |
| 2,277,197 | Ash | Mar. 24, 1942 |
| 2,338,224 | Ash | Jan. 4, 1944 |
| 2,866,650 | Holmstrom | Dec. 30, 1958 |
| 2,878,030 | Couch | Mar. 17, 1959 |
| 2,911,262 | Franck | Nov. 3, 1959 |
| 2,918,302 | Hartenstine | Dec. 22, 1959 |
| 2,988,400 | Ash | June 13, 1961 |
| 3,002,766 | Harris | Oct. 3, 1961 |

FOREIGN PATENTS

| 605,920 | Great Britain | Aug. 3, 1948 |
| 689,827 | Great Britain | Apr. 18, 1953 |